(12) United States Patent
Huang et al.

(10) Patent No.: US 8,307,384 B2
(45) Date of Patent: Nov. 6, 2012

(54) SLOT-IN OPTICAL DISK DRIVE WITH LIFTING EJECTION DEVICE

(75) Inventors: Ko-Han Huang, Taoyuan County (TW); Jen-Chen Wu, Taoyuan County (TW)

(73) Assignee: Quanta Storage Inc., Taoyuan County (TW)

( * ) Notice: Subject to any disclaimer, the term of this patent is extended or adjusted under 35 U.S.C. 154(b) by 127 days.

(21) Appl. No.: 12/887,701

(22) Filed: Sep. 22, 2010

(65) Prior Publication Data

US 2011/0088049 A1   Apr. 14, 2011

(30) Foreign Application Priority Data

Oct. 8, 2009   (TW) .............................. 98134445 A

(51) Int. Cl.
*G11B 17/04*   (2006.01)
(52) U.S. Cl. ..................................... 720/623
(58) Field of Classification Search ............... 360/99.02, 360/99.03, 99.05–99.07, 99.12; 720/617, 720/619–626, 641, 645, 655, 703, 706–709, 720/600, 601
See application file for complete search history.

(56) References Cited

U.S. PATENT DOCUMENTS

2002/0067687 A1 *   6/2002   Kato .............................. 369/271
2009/0249376 A1 *  10/2009   Eguchi ......................... 720/619

FOREIGN PATENT DOCUMENTS

JP          2004039193 A   *   2/2004

OTHER PUBLICATIONS

Machine-Assisted translation of JP 2004039193 A.*

* cited by examiner

*Primary Examiner* — Nathan Danielsen
(74) *Attorney, Agent, or Firm* — Rabin & Berdo, P.C.

(57) ABSTRACT

A slot-in optical disk drive with lifting ejection device is disclosed. A sliding device which has a first guiding slot and a second guiding slot is driven by a transmission unit. A sliding bolt protruded from a traverse is inserted into the first guiding slot, and the traverse connects with the sliding device. A lifting ejection device has a column vertically set in a housing and a sleeve which covers the column. A guiding pin protruded from the sleeve is inserted into the second guiding slot and is driven by the sliding device to disengage an optical disk.

10 Claims, 5 Drawing Sheets

SLOT-IN OPTICAL DISK DRIVE WITH LIFTING EJECTION DEVICE

This application claims the benefit of Taiwan application Serial No. 98134445, filed Oct. 8, 2009, the subject matter of which is incorporated herein by reference.

BACKGROUND OF THE INVENTION

1. Field of the Invention

The invention relates in general to a slot-in optical disk drive, and more particularly to a lifting ejection device of a slot-in optical disk drive which disengages an optical disk from a clamping device disposed on a spindle motor.

2. Description of the Related Art

Along with the rapid advance and popularity in consumer electronic products for information and communication, optical disk drives are also directed towards the trend of slimness, thinness, lightweight and compactness. Despite the reduction in the thickness of the optical disk drive is conducive to portability, the contraction in the internal space of the optical disk drive makes the layout of internal parts and elements even more difficult.

As indicated in FIG. 1, a slot-in optical disk drive 10 of prior art is shown. When the slot-in optical disk drive 10 loads in an optical disk, the traverse 11 rotates and ascends, and the optical disk 14 clamped by a clamping device 12 is rotated by the spindle motor 13, wherein one end of the traverse 11 is pivotally disposed on the slot-in optical disk drive 10, and the clamping device 12 is located on the other end of the traverse 11. When unloading an optical disk, the traverse 11 rotates and descends, an unloading lever 16 pushes against the non-data region 18 set in the inner tracks of the optical disk 13 for disengaging the optical disk 14 from the clamping device 12 so that the optical disk 14 can be unloaded from the slot-in optical disk drive 10, in which the unloading lever 16 is fixed on a housing 15 and passes the through hole 17 set on the traverse 11, and the through hole 17 is set near the peripheral of the spindle motor 13.

However, the manufacturing quality of the optical disk is inconsistent. The standard thickness of the optical disk is 1.2 mm. Thinner optical disks are provided in commercial market due to cost-down consideration, or even have non-uniform thickness due to manufacturing factors, making the optical disk too thin and too soft. When the slot-in optical disk drive 10 unloads an optical disk, the unloading lever 16 with fixed length cannot smoothly disengage the optical disk 14 clamped by the clamping device 12 due to the pushing height being too short. Thus, the disk unloading movement may fail easily. In addition, since the height of the unloading lever 16 is fixed, when the traverse 11 ascends and rotates the optical disk 14, the optical disk 14 needs to be higher than the protruded unloading lever 16 to avoid interfering with the rotation of the optical disk 14. Thus, the thickness of the slot-in optical disk drive 10 needs to satisfy the above requirement, and cannot be too thinned further. Therefore, the slot-in optical disk drive of prior art still has many issues to be resolved when it comes to the structure of disengaging the optical disk with the unloading lever.

SUMMARY OF THE INVENTION

According to a first aspect of the present invention, a slot-in optical disk drive with lifting ejection device is provided. In the present invention, the thickness of the slot-in optical disk drive is reduced by shortening the height of the lifting ejection device and reducing the rising height of the traverse.

According to a second aspect of the present invention, a slot-in optical disk drive with lifting ejection device is provided. In the present invention, the force for disengaging the optical disk is increased by lifting the lifting ejection device to increase the pushing height.

To achieve the above objects, a slot-in optical disk drive with lifting ejection device is disclosed in the invention. A sliding device which has a first guiding slot and a second guiding slot is driven by a transmission unit. A sliding bolt protruded from a traverse is inserted into the first guiding slot, and the traverse connects with the sliding device. A lifting ejection device has a column vertically set in the slot-in optical disk drive and a sleeve which covers the column. A guiding pin protruded from the sleeve is inserted into the second guiding slot and the sleeve is driven by the sliding device to disengage an optical disk when the traverse ascends and lower the height of the lifting ejection device when the traverse descends.

The above and other aspects of the invention will become better understood with regard to the following detailed description of the preferred but non-limiting embodiment(s). The following description is made with reference to the accompanying drawings.

DETAILED DESCRIPTION OF THE INVENTION

The technologies and their effects adopted in the invention for achieving the above objects are disclosed below in a number of preferred embodiments with accompanying drawings.

Figure 1:
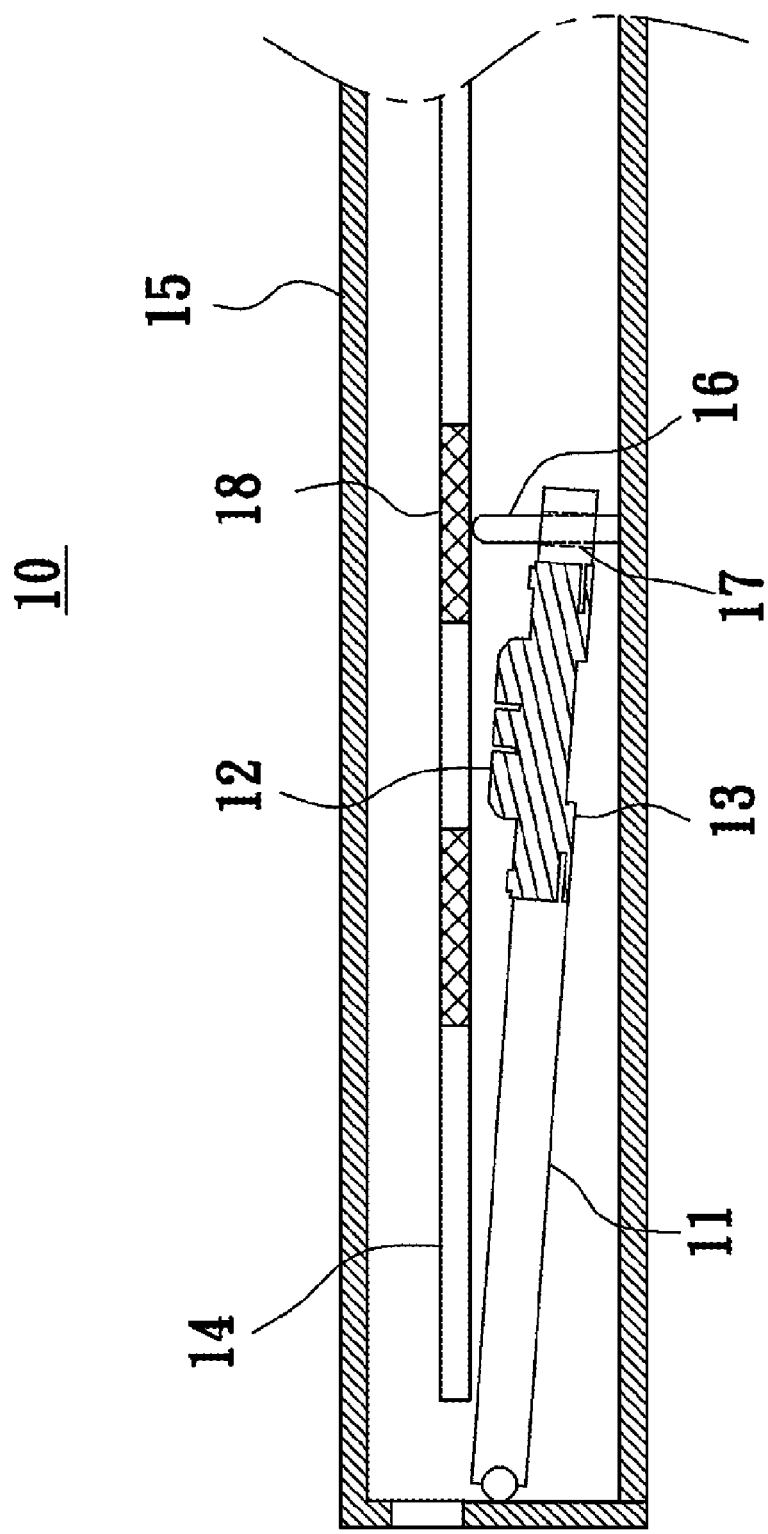
FIG. 1 shows a partial cross-sectional view of a conventional slot-in optical disk drive.
Figure 2:
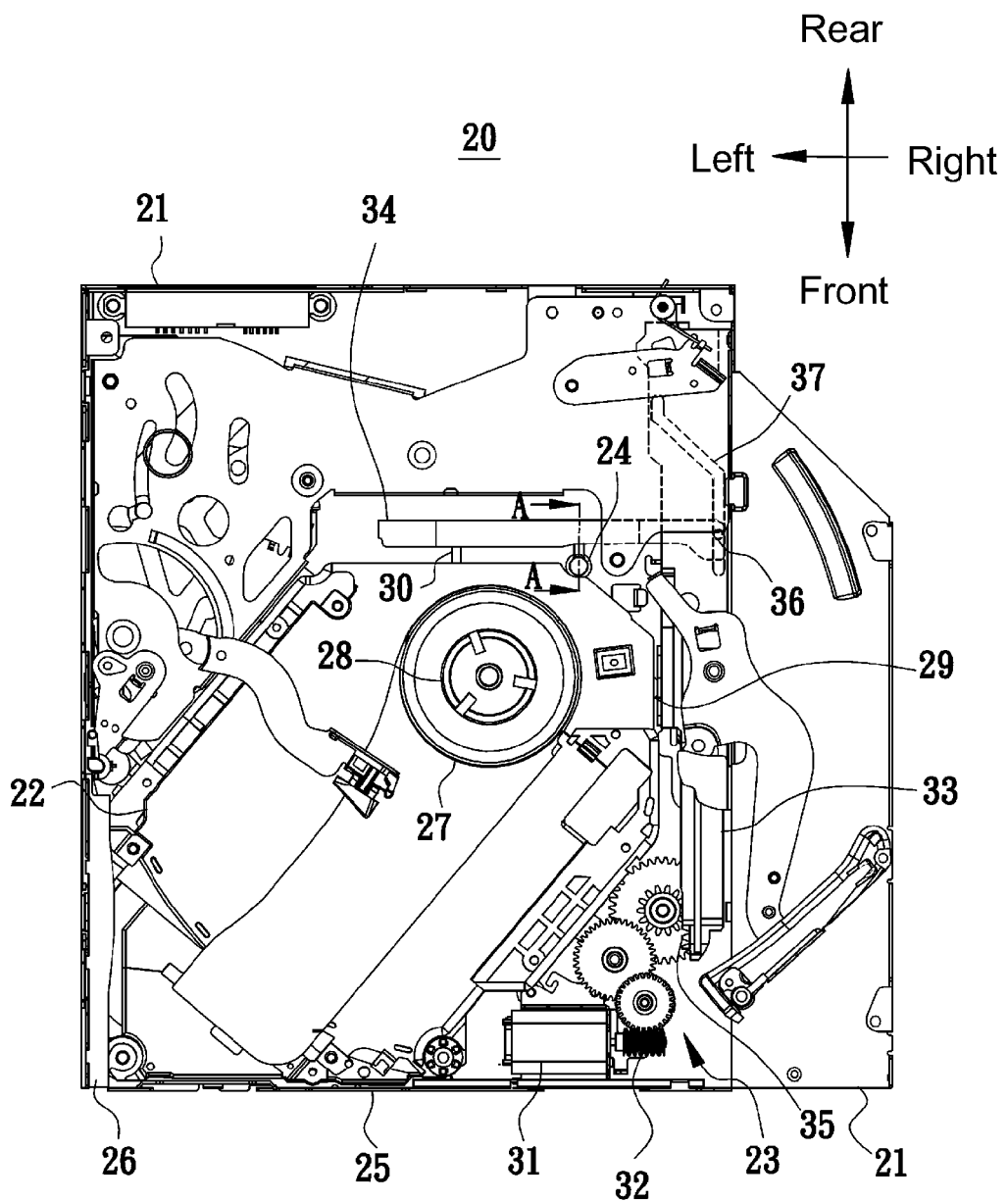
FIG. 2 shows a top view of a slot-in optical disk drive with lifting ejection device of the invention.

Referring to FIG. 2, a top view of a slot-in optical disk drive 20 with lifting ejection device of the invention is shown. The slot-in optical disk drive 20 includes a housing 21, a traverse 22, a transmission unit 23 and a lifting ejection device 24. The housing 21 has a hollowed inside, and the front end of the housing 21 has an entrance/exit 25 for an optical disk D (referring to FIG. 5) to pass through. The traverse 22 is disposed in the housing 21, wherein one end of the traverse 22 is pivotally connected to one side of the housing 21 towards the entrance/exit 25 and forms a pivotal end 26, which is used as a pivotal point for the traverse 22 to rotate upward and downward. The other end of the traverse 22 near the center of the slot-in optical disk drive has a spindle motor 27, and a clamping mechanism 28 is disposed on the spindle motor 27 for fixing the optical disk. A first sliding bolt 29 and a second sliding bolt 30 are protruded from an edge side of the traverse 22 near the spindle motor 27.

The transmission unit 23 disposed near a side of the traverse 22 provides a power source for transmitting the slot-in optical disk drive. The transmission unit 23 includes a transmission motor 31, a gear set 32, a first sliding device 33 and a second sliding device 34. The transmission motor 31 disposed near the entrance/exit 25 drives one end of a gear set 32, which is composed of a plurality of gears. The other end of the gear set 32 is engaged with the rack 35 of the first sliding device 33 for driving the first sliding device 33 to slide forward and backward along a lateral side of the housing 21, wherein the first sliding device 33 is disposed near a side edge of the first sliding bolt 29 of the traverse 22. The first sliding device 33 further connects with the first sliding bolt 29 via a guiding slot (not illustrated in the diagram). The second sliding device 34 is slidably disposed on the housing 21 in a transverse direction and near the back end of the second sliding bolt 30 of the traverse 22. One end of the second sliding device 34 has a sliding pin 36, which is horizontally moved along the guiding slot 37 of the first sliding device 33. The lifting ejection device 24 is disposed between the traverse 22 and the second sliding device 34.

Figure 3:
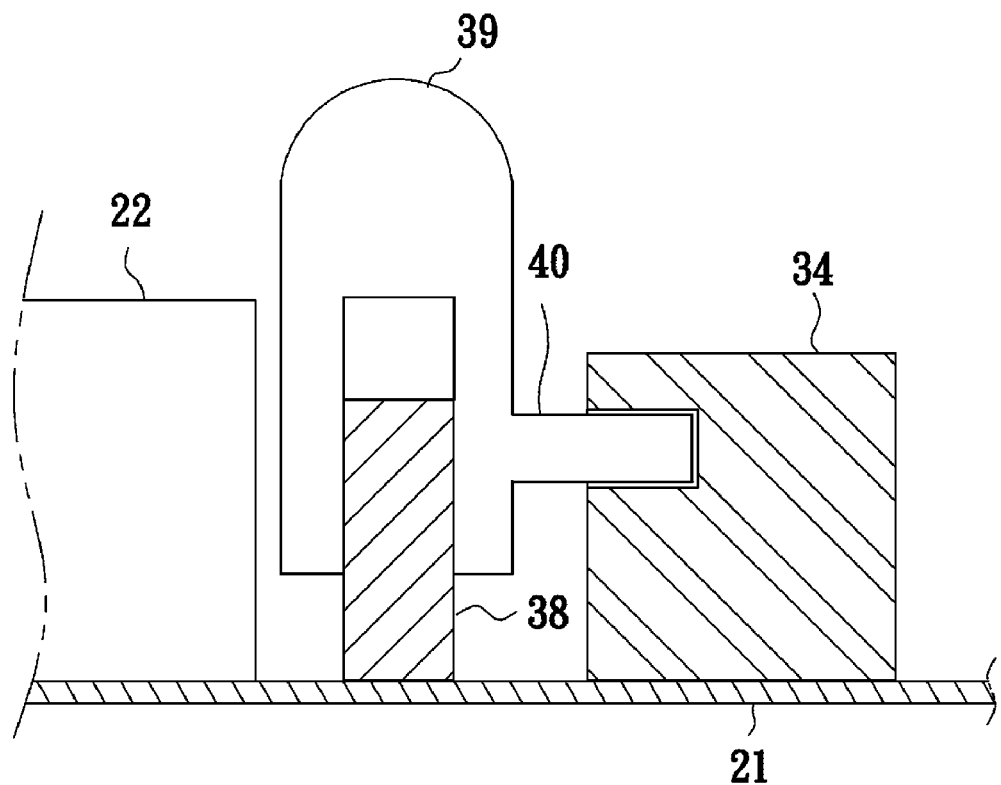
FIG. 3 shows a cross-sectional view of a lifting ejection device along the A-A line of FIG. 2.
Figure 4:
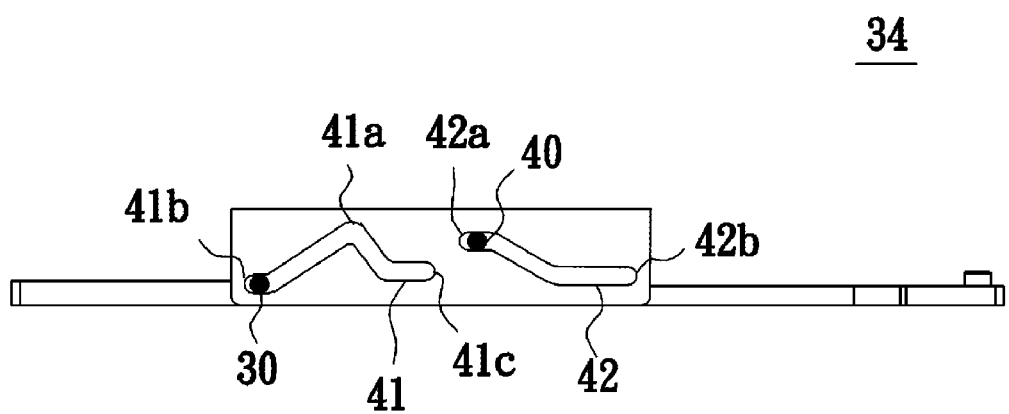
FIG. 4 shows a sectional view of a second sliding device of the invention in a stand-by state.

Referring to FIG. 3 and FIG. 4. FIG. 3 shows a cross-sectional view of a lifting ejection device along the A-A line of FIG. 2. The lifting ejection device 24 of FIG. 3, being a sleeve-like column, includes a column 38 vertically set on the housing 21 and a sleeve 39 which covers the column 38. The sleeve 39 is driven upward or downward by the column 38. A guiding pin 40 protruded from a lateral side of the sleeve 39 is inserted into a side surface of the second sliding device 34. The second sliding device 34 of FIG. 4 has a first guiding slot 41 and a second guiding slot 42 rolling up and down near a side surface of the second sliding bolt 30. The first guiding slot 41 has a single peak, wherein the peak 41a is in the middle, and a stand-by end 41b and a play end 41c higher than the stand-by end 41b are disposed at the two ends of the first guiding slot 41 for receiving the second sliding bolt 30 and enabling the second sliding bolt 30 to move along the first guiding slot 38 and the second sliding bolt 30 connects with the traverse 22 to move upward and downward. The second guiding slot 42 is like a slanting L, wherein a lifting end 42a and a narrow end 42b lower than the lifting end 42a are disposed at two ends of the second guiding slot 42 for receiving the guiding pin 40 to drive the sleeve 39 upward and downward.

Figure 5:
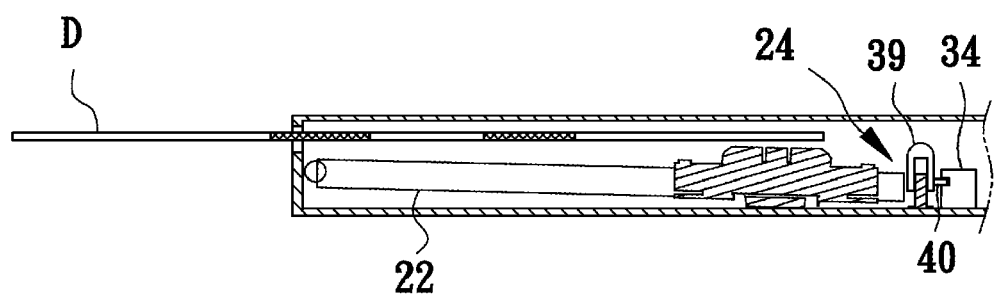
FIG. 5 shows a cross-sectional view of a slot-in optical disk drive of the invention in a stand-by state.

The movements of the lifting ejection device 24 of the invention are disclosed in FIG. 2, FIG. 3, FIG. 4 and FIG. 5. FIG. 5 shows a slot-in optical disk drive 20 being in a stand-by state. The slot-in optical disk drive 20 of FIG. 2 has a sliding pin 36 located at the front end of the guiding slot 37 of the first sliding device 33, and the second sliding device 34 is moved towards the right hand side of the slot-in optical disk drive 20, so that when the second sliding bolt 30 is located at the left end (the stand-by end 41b) of the first guiding slot 41, the traverse 22 descends to the stand-by position. When the guiding pin 40 is located at the highest left end (the lifting end 42a) of the second guiding slot 42, the sleeve 39 of the lifting ejection device 24 is lifted for putting the slot-in optical disk drive 20 in a stand-by state as indicated in FIG. 5. When the slot-in optical disk drive 20 detects that an optical disk D is loaded into the slot-in optical disk drive 20, the transmission motor 31 is activated to rotate the gear set 32, which further drives the rack 35 of the first sliding device 33 to move forward to load in the optical disk. Then, the optical disk is guided to be positioned at a predetermined position. The guiding slot 37 is driven to move forward along with the first sliding device 33, and the sliding pin 36 connects with the second sliding device 34 to move leftward.

Figure 6:
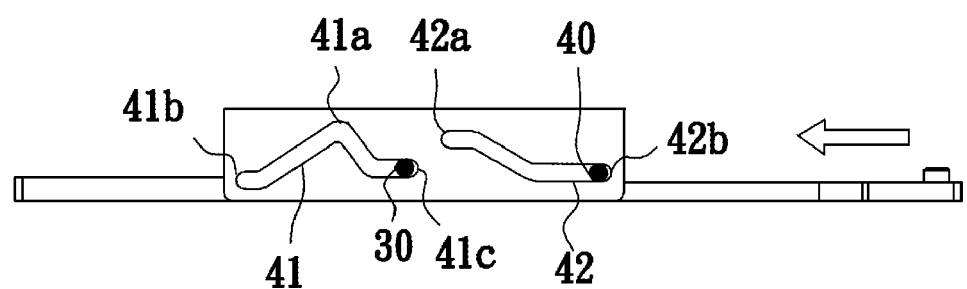
FIG. 6 shows a cross-sectional view of a second sliding device of the invention in a play state.
Figure 7:
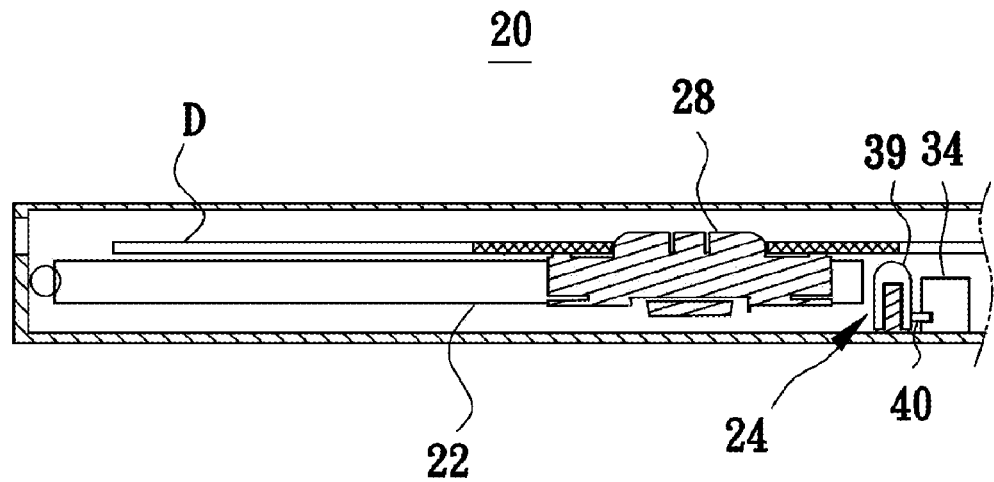
FIG. 7 shows a cross-sectional view of a slot-in optical disk drive of the invention in a play state.

Referring to FIG. 6 and FIG. 7. FIG. 6 shows a second sliding device 34 being moved leftward. FIG. 7 shows a slot-in optical disk drive 20 having loaded in a disk D. As indicated in FIG. 6, as the second sliding device 34 is moved leftward, the second sliding bolt 30 passes the peak 41a of the first guiding slot 41 and lifts the traverse 22 to clamp the optical disk D with the clamping device 28, then the second sliding bolt 30 descends towards the play end 41c of the first guiding slot 41 for putting the traverse 22 in a play position. As the second sliding device 34 is moved leftward, the guiding pin 40 is moved to the narrow end 42b along the second guiding slot 42, so that the sleeve 39 descends, the height of the lifting ejection device 24 is reduced, and more space is provided for the optical disk D to rotate safely. Thus, the rotated optical disk D can avoid the sleeve 39 as long as the play position of the traverse 22 is slightly higher than the stand-by position, and such design further reduces the thickness of the slot-in optical disk drive 20.

Figure 8:
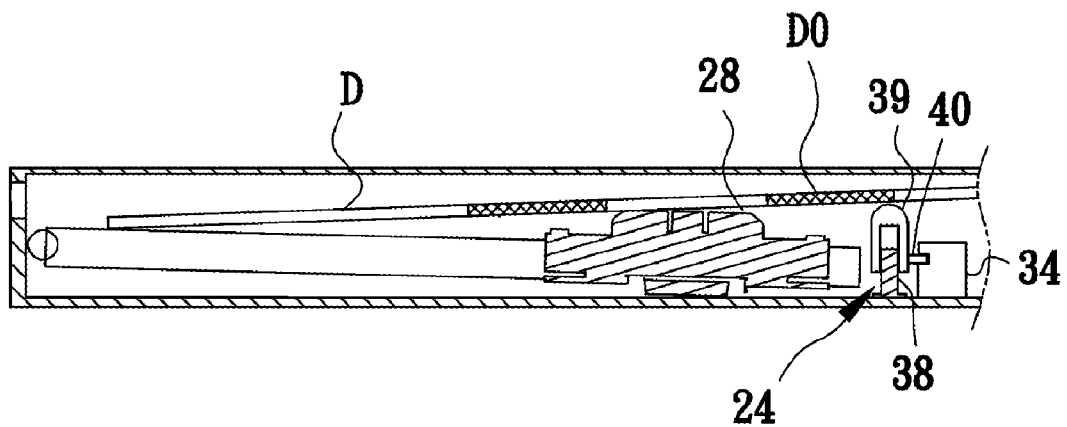
FIG. 8 shows a cross-sectional view of a slot-in optical disk drive of the invention ejecting an optical disk.

Referring to FIG. 2, FIG. 4 and FIG. 8. FIG. 8 shows a lifting ejection device 24 ejecting an optical disk D. When the slot-in optical disk drive unloads an optical disk, the transmission motor 31 of FIG. 2 is inversely rotated, and drives the rack 35 of the first sliding device 33 through the gear set 32, so that the first sliding device 33, which has been moved to the front end, moves the guiding slot 37 backwardly, and the second sliding device 34 connected via the sliding pin 36 moves rightward to the stand-by position. In FIG. 4, the traverse 22 is lifted to the peak 41a as the second sliding bolt 30 slides along the first guiding slot 41. When the traverse 22 is lifted to the highest point, a space is created for the lifting ejection device 24 to lift the sleeve 39 as the guiding pin 40 slides along the second guiding slot 42. The sleeve 39, being supported by the column 38, can be lifted to the highest point with respect to the traverse 22. Then, the guiding pin 40 further horizontally slides to the lifting end 42b along the second guiding slot 42 for allowing the sleeve 39 to maintain at the highest point. Meanwhile, the traverse 22 passes through the peak 41a of the first guiding slot 41 along with the second sliding bolt 30 and descends to the stand-by end 41b for creating a path for unloading the optical disk D. As indicated in FIG. 8, the optical disk D, being clamped by the clamping device 28 of the traverse 22, cannot be descended accordingly because the lifted sleeve 39 exactly pushes the non-data region D0 at the inner tracks of the optical disk D. Thus, the optical disk D is disengaged from the clamping device 28 of the traverse 22 to be unloaded.

The lifting ejection device 24 of the slot-in optical disk drive of the invention, being lifted by the sleeve 39, becomes higher than the traverse 22 to an extent that the lifting ejection device 24 can disengage the optical disk D more forcefully, hence improving the defect of the prior art in which the unloading lever is fixed. Furthermore, since the sleeve 39 descends, the height of the lifting ejection device 24 is reduced, and the thickness of the slot-in optical disk drive can be further reduced and will not be restricted by the height of the unloading lever which is fixed in the prior art. The present embodiment of the invention is exemplified by the example of driving the lifting ejection device 24 to ascend/descend by the second sliding device 34, but is not limited thereto. The lifting ejection device 24 of the invention can also be driven to ascend/descend by a first sliding device 33, and the objects and effects of the invention still can be achieved.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A slot-in optical disk drive with lifting ejection device, comprising:
   a transmission unit for supplying a power to slide a sliding device;
   a traverse connected with the sliding device which moves the traverse upward and downward, wherein a clamping device is disposed on the traverse for clamping an optical disk; and
   a lifting ejection device moved with the sliding device for disengaging the optical disk from the clamping device, the lifting ejection device being a sleeve-like column.

2. The slot-in optical disk drive with lifting ejection device according to claim 1, wherein the sleeve-like column comprises a column set on the slot-in optical disk drive and a sleeve which covers the column, and the sleeve ascends and descends along with the column.

3. The slot-in optical disk drive with lifting ejection device according to claim 2, wherein the slot-in optical disk drive has a housing on which the column is vertically set.

4. The slot-in optical disk drive with lifting ejection device according to claim 2, wherein a guiding pin protruded from a side of the sleeve side is inserted into the sliding device and connects with the sliding device.

5. The slot-in optical disk drive with lifting ejection device according to claim 4, wherein the sliding device has a first guiding slot and a second guiding slot, the sliding bolt protruded from a side edge of the traverse is inserted into the first guiding slot and slides therein, and the guiding pin is inserted into the second guiding slot and slides therein.

6. The slot-in optical disk drive with lifting ejection device according to claim 5, wherein the first guiding slot has a single peak in the middle, and a stand-by end and a play end respectively disposed at the two ends of the first guiding slot, the play end is higher than the stand-by end, and the second guiding slot is like a slanting L whose higher end is the lifting end and lower end is the narrow end.

7. The slot-in optical disk drive with lifting ejection device according to claim 6, wherein when the slot-in optical disk drive loads in the optical disk, the sliding bolt moves towards the play end of the first guiding slot, and at the same time the guiding pin is moved to the narrow end along the second guiding slot, and the height of the lifting ejection device is reduced.

8. The slot-in optical disk drive with lifting ejection device according to claim 6, wherein when the slot-in optical disk drive unloads the optical disk, the sliding bolt ascends to the peak along the first guiding slot and lifts the traverse to a highest point first, and then the guiding pin ascends along the second guiding slot and lifts the sleeve.

9. The slot-in optical disk drive with lifting ejection device according to claim 8, wherein when the slot-in optical disk drive unloads the optical disk, the sliding bolt passes through the peak and moves towards the stand-by end of the first guiding slot for descending the traverse, and at the same time, the guiding pin moves to the lifting end along the second guiding slot to lift the lifting ejection device to disengage the optical disk.

10. A slot-in optical disk drive with lifting ejection device, comprising:
   a transmission unit for supplying a power to slide a sliding device;
   a traverse connected with the sliding device which moves the traverse upward and downward, wherein a clamping device is disposed on the traverse for clamping an optical disk; and
   a lifting ejection device moved with the sliding device for disengaging the optical disk from the clamping device,
   wherein the transmission unit drives the sliding device disposed near a side edge of the traverse to slide forward and backward along a lateral side of the slot-in optical disk drive, and horizontally moves the sliding device with a guiding slot disposed thereon; and
   wherein the lifting ejection device is disposed between the traverse and the sliding device.

* * * * *